United States Patent
Whitehead et al.

(10) Patent No.: US 7,400,294 B2
(45) Date of Patent: Jul. 15, 2008

(54) PORTABLE REFERENCE STATION FOR LOCAL DIFFERENTIAL GPS CORRECTIONS

(75) Inventors: Michael L. Whitehead, Scottsdale, AZ (US); John McClure, Scottsdale, AZ (US)

(73) Assignee: Hemisphere GPS Inc., Calgary (CA)

( * ) Notice: Subject to any disclaimer, the term of this patent is extended or adjusted under 35 U.S.C. 154(b) by 229 days.

(21) Appl. No.: 11/250,762

(22) Filed: Oct. 14, 2005

(65) Prior Publication Data
US 2007/0085734 A1   Apr. 19, 2007

(51) Int. Cl.
*G01S 5/14* (2006.01)
(52) U.S. Cl. .................................. 342/357.03
(58) Field of Classification Search ............. 342/357.08
See application file for complete search history.

(56) References Cited

U.S. PATENT DOCUMENTS

| | | | |
|---|---|---|---|
| 4,751,512 A | 6/1988 | Longaker |
| 4,812,991 A | 3/1989 | Hatch |
| 5,148,179 A | 9/1992 | Allison |
| 5,155,490 A | 10/1992 | Spradley et al. |
| 5,323,322 A | 6/1994 | Mueller et al. |
| 5,365,447 A | 11/1994 | Dennis |
| 5,389,934 A | 2/1995 | Kass |
| 5,467,282 A | 11/1995 | Dennis |
| 5,471,217 A | 11/1995 | Hatch et al. |
| 5,477,228 A | 12/1995 | Tiwari et al. |
| 5,477,458 A | 12/1995 | Loomis |
| 5,490,073 A | 2/1996 | Kyrtsos |
| 5,523,761 A | 6/1996 | Gildea |
| 5,583,513 A | 12/1996 | Cohen |
| 5,608,393 A | 3/1997 | Hartman |
| 5,610,616 A | 3/1997 | Vallot et al. |
| 5,617,100 A | 4/1997 | Akiyoshi et al. |
| 5,702,070 A | 12/1997 | Waid |
| 5,739,785 A | 4/1998 | Allison et al. |
| 5,821,900 A | 10/1998 | Kishimoto |
| 5,828,336 A | 10/1998 | Yunck et al. |
| 5,899,957 A | 5/1999 | Loomis |
| 5,903,235 A | 5/1999 | Nichols |
| 5,936,573 A * | 8/1999 | Smith .................. 701/213 |
| 6,018,313 A | 1/2000 | Engelmayer et al. |
| 6,023,239 A | 2/2000 | Kovach |
| 6,049,304 A | 4/2000 | Rudel et al. |
| 6,061,632 A | 5/2000 | Dreier |

(Continued)

OTHER PUBLICATIONS

Bradford W. Parkinson and James J. Spiker, Jr., eds., "Global Positioning System: Theory and Applications, vol. II", 1995, AIAA, Reston, VA USA, pp. 3-50.

*Primary Examiner*—Gregory C Issing
(74) *Attorney, Agent, or Firm*—Mark E. Brown

(57) ABSTRACT

A method and system for local computation of information to improve accuracy in a differential Global Navigation Satellite Systems (GNSS). The method comprising: determining a current location of a reference receiver; comparing the current location with at least one stored location; if a resultant of the comparing is less than a selected threshold, identifying as a reference location the at least one stored location, which is closest to the current location; otherwise establishing the current location as the reference location and storing the current location. The method also includes computing the information from signals from one or more GNSS satellites the based on the reference location; and transmitting the information for reception by one or more remote receivers.

3 Claims, 2 Drawing Sheets

U.S. PATENT DOCUMENTS

| | | | |
|---|---|---|---|
| 6,100,842 A * | 8/2000 | Dreier et al. ........... 342/357.08 |
| 6,144,335 A | 11/2000 | Rogers |
| 6,198,430 B1 | 3/2001 | Hwang et al. |
| 6,230,097 B1 | 5/2001 | Dance et al. |
| 6,304,210 B1 | 10/2001 | Allison et al. |
| 6,324,473 B1 | 11/2001 | Eschenbach |
| 6,371,416 B1 | 4/2002 | Hawthorne |
| 6,380,888 B1 * | 4/2002 | Kucik ................... 342/357.03 |
| 6,392,589 B1 | 5/2002 | Rogers et al. |
| 6,411,254 B1 | 6/2002 | Moeglein et al. |
| 6,415,229 B1 | 7/2002 | Diekhans |
| 6,425,186 B1 | 7/2002 | Oliver |
| 6,449,558 B1 * | 9/2002 | Small ........................ 701/213 |
| 6,469,663 B1 * | 10/2002 | Whitehead et al. ..... 342/357.03 |
| 6,484,097 B2 | 11/2002 | Fuchs et al. |
| 6,567,041 B1 | 5/2003 | O'Dell |
| 6,618,671 B2 | 9/2003 | Dooley et al. |
| 6,756,938 B2 | 6/2004 | Zhao et al. |
| 6,788,951 B2 | 9/2004 | Aoki et al. |
| 6,819,269 B2 | 11/2004 | Flick |
| 6,822,314 B2 | 11/2004 | Beasom |
| 6,865,484 B2 | 3/2005 | Miyasaka |
| 2006/0017611 A1 * | 1/2006 | Hatch et al. ............ 342/357.03 |

* cited by examiner

PORTABLE REFERENCE STATION FOR LOCAL DIFFERENTIAL GPS CORRECTIONS

FIELD OF THE INVENTION

The invention relates generally to Global Navigation Satellite System (GNSS) for example, Global Positioning System (GPS) receivers, and more particularly to a method for computing a precise relative location using a single differential GNSS/GPS receiver that acts as a reference station by generating differential correction terms.

BACKGROUND

One GNSS is the Global Positioning System (GPS), which was established by the United States government, and employs a constellation of 24 or more satellites in well-defined orbits at an altitude of approximately 26,500 km. These satellites continually transmit radio signals in two frequency bands, centered at 1575.42 MHz and 1227.6 MHz., denoted as L1 and L2 respectively. These signals include timing patterns relative to the satellite's onboard precision clock (which is kept synchronized by a ground station) as well as a navigation message giving the precise orbital positions of the satellites, an ionosphere model, and other useful information. GPS receivers process the radio signals, computing ranges to the GPS satellites, and by triangulating these ranges, the GPS receiver determines its position and its internal clock error.

To overcome the errors of standalone GPS systems such as satellite clock error, and propagation delays that result when the signal travels through the ionosphere and troposphere, many applications of GPS have made use of data from multiple GPS receivers. Typically, in such applications, a reference receiver, located at a reference site having known coordinates, receives the GPS satellite signals simultaneously with the receipt of signals by a remote receiver. Depending on the separation distance between the two GPS receivers, many of the errors mentioned above will affect the satellite signals equally for the two receivers. By taking the difference between signals received both at the reference site and at the remote location, the errors are effectively eliminated. This facilitates an accurate determination of the remote receiver's coordinates relative to the reference receiver's coordinates.

The technique of differencing signals from two or more GPS receivers to improve accuracy is known as differential GPS (DGPS). It includes local DGPS systems that utilize a single reference receiver that delivers either range measurements or corrections to its range measurements to one or more remote receivers so that the remote receivers can correct its range measurements. If range measurements rather than differential correctors are utilized, the remote receiver must know the location of the reference receiver so that it may compute the correctors (or their equivalent) internally. For brevity, throughout this disclosure, we shall refer to the data sent by the reference in either approach as differential correctors even though technically, in some instances, is simply range measurements that are sent. DGPS also encompasses Wide Area Differential GPS (WADGPS) where differential correction terms are generated by combining data from multiple reference GPS receivers spread geographically over a region of intended coverage. In all forms of DGPS, however, the positions obtained by the end user's remote receiver are relative to the position(s) of the reference receiver(s). Thus, absolute accuracy of any DGPS system depends heavily on the accuracy at which the reference receiver locations were determined when installing or implementing the DGPS system.

In many applications involving GNSS/GPS relative accuracy is often all that is necessary or desired. In these cases, the reference location need not be extremely accurate relative to any one particular coordinate system. That is, it is not a question of determining so much exact position, but position relative to some starting point with a high degree of accuracy. For example, the primary need for swathing applications that guide farm vehicles applying pesticides, fertilizer, and the like is to be able to guide the vehicle so that, relative to an initial swath, the subsequent swaths are at a series of pre-scribed offsets from the original swath (or from each other). There is often no accuracy requirement on the initial swath, only that subsequent swaths be accurate relative to the initial swath.

Of course, with relative positioning, it is still necessary to have the position of the reference location. A matter simply addressed if relative accuracy is indeed all that is required. For first time operation in a new geographic area, the reference location may be determined as the position of the GPS receiver as computed from the ensemble of the non-differentially corrected GPS range measurements at some point prior to going into differential mode. For future use in the same area a new reference may be determined, or the location may be retrieved from computer memory (or other sources) after having returned to a mark for which this location was determined. The location also could have been determined in a past operation of relative DGPS positioning. Finally, of course, the location could be manually supplied based on external information, such as a survey.

Standard methods of supplying differential corrections to a GNSS (typically GPS) receiver have been available for many years. For example, RTCM GPS correctors are sent out from fixed reference stations maintained by the Coast Guard (or other governmental agencies for non-US systems) and are transmitted in the 300 KHz radio band of the radio spectrum. Transmissions of such signals propagate over a few hundred kilometers. Commercial operators have also supplied RTCM correctors via VHF and UHF radio links operating over several tens of kilometers.

More recently, other sources of differential corrections designed primarily for single frequency GNSS receivers (L1 only receivers) have arisen such as those from Satellite Based Augmentation Systems (SBAS), an example of which is the Wide Area Augmentation System (WAAS). For dual frequency L1/L2 receivers, commercial satellite based correctors are available such as those from Omnistar or John Deere. Local differential correctors sent by radio can be supplied for operation in high accuracy real time kinematic (RTK) mode. Subscriptions to such L1/L2 based differential services are often expensive as is the dual frequency receiver technology. Many applications, such as swath guidance for farming, commonly require vehicle navigation or guidance accuracy exceeding that provided by SBAS capable L1 receivers alone and thus must rely on these more expensive technologies.

Therefore, what is needed is an economical means to rapidly deploy a cost effective GNSS differential reference station readily configured to supply differential correctors over a local area, typically 10 km radius or less.

SUMMARY OF THE INVENTION

Disclosed herein in an exemplary embodiment is a system for local computation of information to improve accuracy in differential Global Navigation Satellite Systems (GNSS).

The system comprising: a reference receiver system, the reference receiver system configured to determine a current location of the reference receiver system, the reference receiver system further configured to retrieve a stored location which is closest to the current location and comparing the current location with the one stored locations, if a resultant of the comparing is less than a selected threshold, the reference receiver identifies as a reference location the stored location, otherwise the current location is established as the reference location and stored; the reference receiver system is further configured to derive from signals from one or more GNSS satellites the information used to improve the accuracy of a remote unit based on the reference location. The system also includes at least one other receiver system, the at least one other receiver system configured as a remote unit; and a communications link in operable communication with at least the reference receiver system and the at least one other receiver system, the communications system configured to transmit the information for reception by one or more remote receivers.

Also disclosed herein in another exemplary embodiment is a method for local computation of information to improve accuracy in a differential Global Navigation Satellite Systems (GNSS). The method comprising: determining a current location of a reference receiver; comparing the current location with at least one stored location; if a resultant of the comparing is less than a selected threshold, identifying as a reference location the at least one stored location, which is closest to the current location; otherwise establishing the current location as the reference location and storing the current location. The method also includes computing the information from signals from one or more GNSS satellites the based on the reference location; and transmitting the information for reception by one or more remote receivers.

Further disclosed herein in an exemplary embodiment is a system for local computation of information to improve accuracy in a differential Global Navigation Satellite Systems (GNSS). The system comprising: means for determining a current location of a reference receiver; means for comparing the current location with at least one stored location; means for determining if a resultant of the comparing is less than a selected threshold, and means for identifying as a reference location the at least one stored location, which is closest to the current location; otherwise, means for establishing the current location as the reference location and storing the current location. The system also includes: means for computing the information from signals from one or more GNSS satellites the based on the reference location; and means for transmitting the information for reception by one or more remote receivers.

Also disclosed herein in yet another exemplary embodiment is a storage medium encoded with a machine readable computer program code, the code including instructions for causing a computer to implement the above-mentioned method for local computation of information to improve accuracy in a differential Global Navigation Satellite Systems (GNSS).

Further, in yet another exemplary embodiment, there is disclosed herein a computer data signal, the computer data signal comprising instructions for causing a computer to implement the above-mentioned method for local computation of information to improve accuracy in a differential Global Navigation Satellite Systems (GNSS).

Additional features, fuctions and advantages associated with the disclosed system and methodology will be apparent from the detailed description which follows, particularly when reviewed in conjunction with the figures appended hereto.

IN THE DRAWINGS

To assist those of ordinary skill in the art in making and using the disclosed system and methodology, reference is made to the appended figures, wherein like references are numbered alike in the several figures.

DETAILED DESCRIPTION OF THE EXEMPLARY EMBODIMENTS

Figure 1:
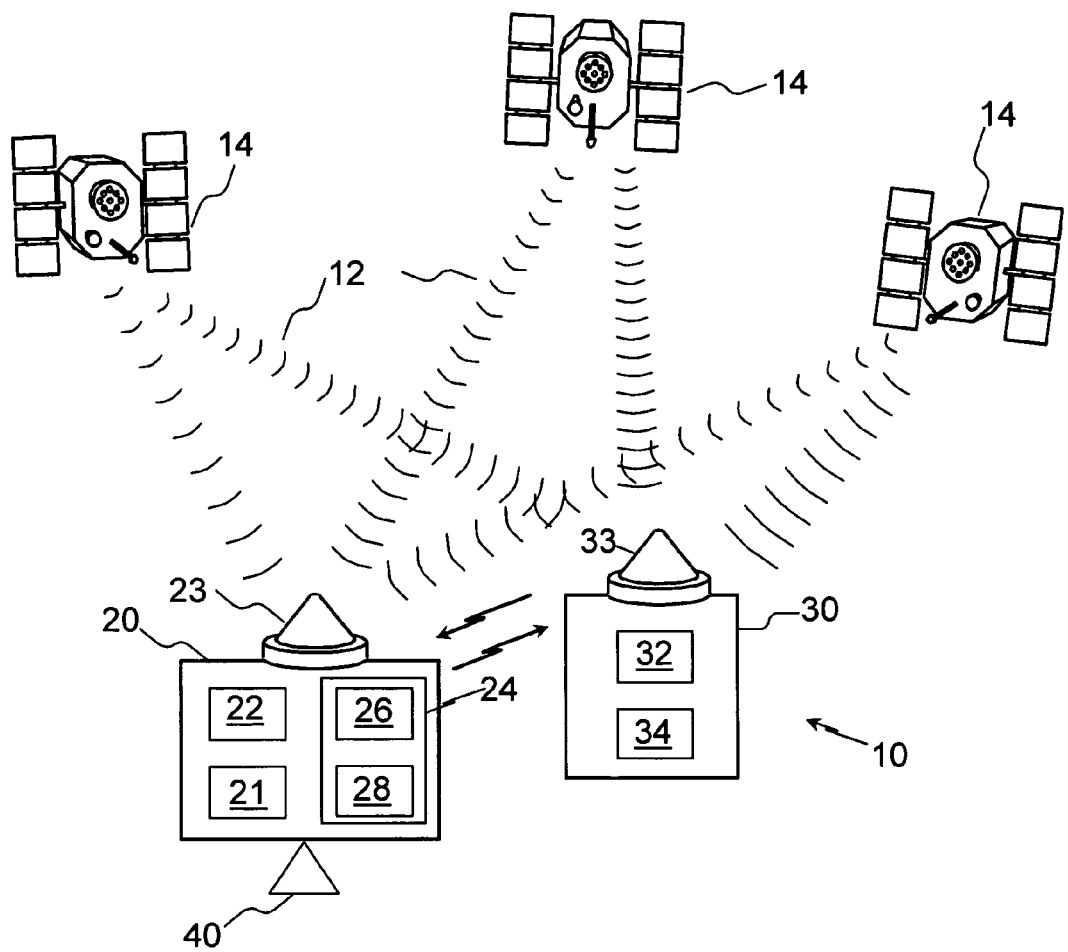
FIG. 1 is a diagrammatic depiction of an exemplary embodiment.

The methods and system described herein facilitate application of a differential reference station capable of being deployed with minimum user interaction. For example, in an exemplary embodiment, setup occurs automatically without the use of standard survey techniques and the setup does not require a skilled operator as in past implementations. With suitable hardware and software, the resulting DGPS positioning accuracy within a standard deviation of 0.2 m is achievable. This accuracy is repeatable, at least in a relative sense, when the reference station is returned to the same location. This is advantageous since subsequent farming operations, such as listing, planting, fertilizing, cultivating and harvesting require that the vehicle and towing implements be consistently placed in the same location. This enables such operations to produce optimum results even while using different vehicles and different farming implements that have different operational widths. The end result is highly optimized yield production, idealized speeds for field operations, and minimization of crop damage. Advantageously, applications of the exemplary embodiments as described herein, permit one reference station configured to supply correctors to an unlimited number of remote systems, specifically remote GNSS/GPS receivers over radio communication, wireless, telephone, via the internet, and the like, as well as combinations including one or more of the foregoing.

The accompanying drawings depict various aspects and features of a preferred embodiment of the invention. By way of illustration as described herein, it may be applied to agriculture. While a preferred embodiment is shown and described, it will be appreciated by those skilled in the art that the invention is not limited to agricultural applications, but may be applied in any capacity where position detection is required.

It is noteworthy to appreciate that the terminology receiver as used herein is intended to include and incorporate a GNSS/GPS system including an RF receiver, decoder, processing and the like sufficient to receive and process GNSS/GPS satellite signals and generated position, velocity, time based measurements and navigation therefrom. Further, the receiver may include processing, a computer and the like sufficient to perform the computations necessary to determine the information needed to enhance the accuracy of a remote unit, including, but not limited to, raw satellite information, range observations, a pseudorange, positioning information, a reference location, phase data, a plurality of differential correctors, and the like, as well as combinations including any of the foregoing all denoted hereinafter as differential correctors as described herein. It should also be appreciated that as used herein a GPS receiver receives and processes satellite information from GPS satellites or other related types. For example: Europe's Galileo satellite navigation system, Global Navigation Satellite System (GLONASS), Wide Area Augmentation Systems (WAAS), European Geostationary Navigation Overlay System (EGNOS), Mobile Satellite (MSAT), or other Global Navigation Satellite Systems (GNSS). Similarly, as described in further detail at a later point herein, when a GPS receiver computes differential correction terms, numerous known methodologies may be employed.

Referring now to FIG. 1, a diagrammatic depiction of GNSS 10 as may be employed in an exemplary embodiment is provided. The system 10 includes a reference station 20 and one or more remote units 30 receptive to satellite signals 12 from a plurality of GNSS satellites 14. The reference station 20 includes, but is not limited to a reference receiver 22 e.g., a GNSS/GPS receiver system coupled to an antenna 23, and reference communication system 24 including a transmitter 26 and optionally a receiver 28. The communication system is configured to at least transmit differential correctors or satellite range observations and the like as described herein. The reference station 20 may optionally include a communications receiver configured to receive external differential correctors, range observations, and/or other input information to facilitate implementation of the embodiments described herein. Furthermore, in another exemplary embodiment, the reference station 20 may include rechargeable battery 21, preferably integrated as part of the with the reference station 20 package. The battery 21 facilitating ease of portable operation and transportation to various locations where the reference station is to be employed.

The remote unit(s) 30, include, but are not limited to, a remote receiver system 32, e.g., GNSS/GPS receiver system coupled to an antenna 33, and a remote communications system 34. The remote communication system 34 is configured to at least receive differential correctors (and possibly additional signals) transmitted from the reference communication system 24.

Figure 2:
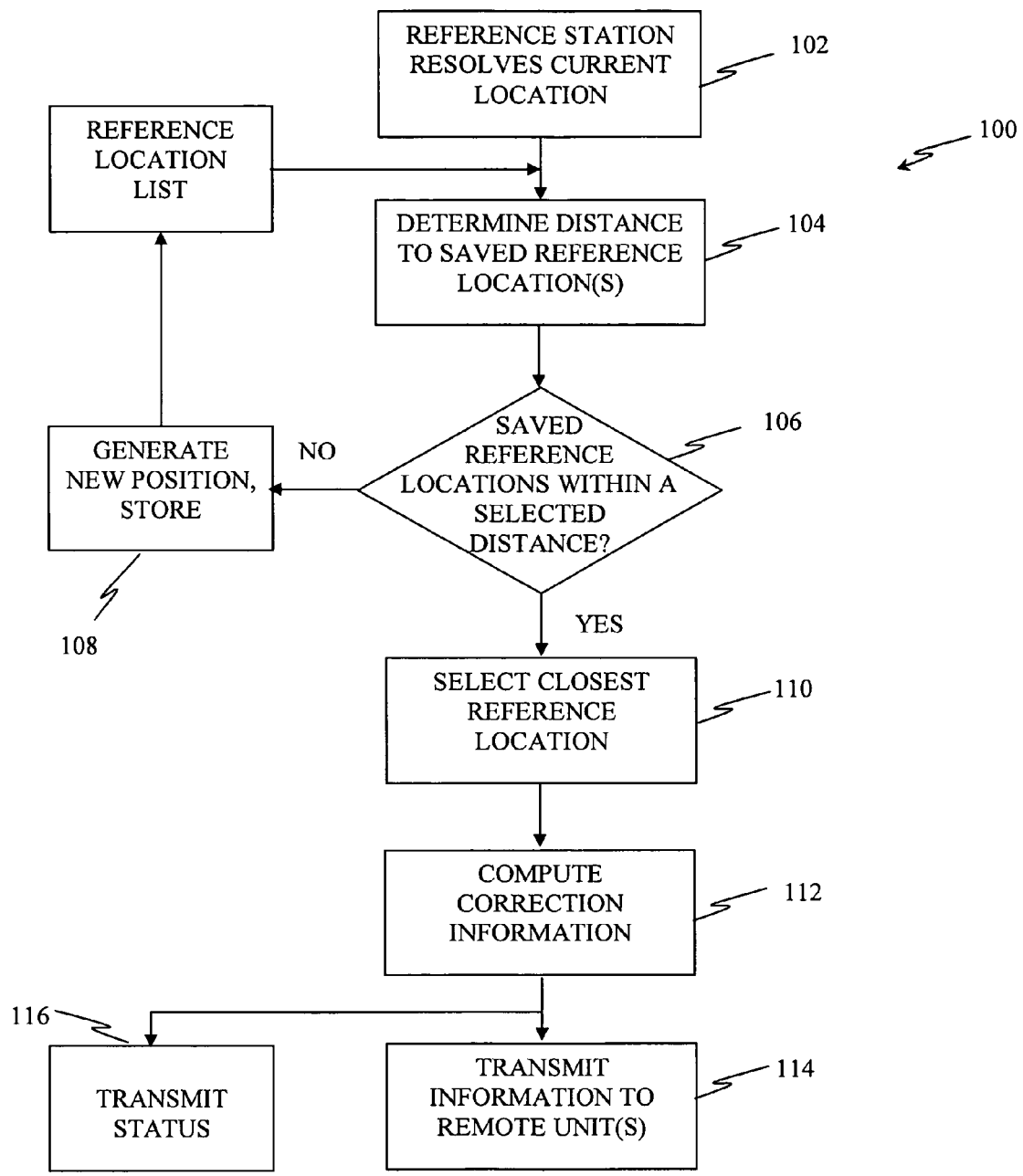
FIG. 2 depicts a flow chart of the disclosed methodology in accordance with and exemplary embodiment.

FIG. 2 depicts a flow chart of the disclosed methodology 100 in accordance with an exemplary embodiment. A series of reference locations is stored in a reference station 20. A single reference location or a set of reference locations can be downloaded from the reference station 20 or uploaded to the reference station 20. This feature allows editing of the desired reference locations on an office PC, computing station, and the like and archiving for future use. Furthermore, a reference location can be surveyed by methods that provide precise and accurate location determination such as standard survey techniques or GPS post processing techniques and this location can then be uploaded to the reference station. The use of such a surveyed location is advantageous when absolute, not relative, accuracy is desired of the remote unit 30.

Continuing with FIG. 2, on deployment, as depicted at process block 102 the reference station 20 resolves its own geographical location using ranging information derived from various GNSS satellite signals and perhaps using corrections contained in SBAS satellite signals. Process block 104 depicts the reference station 20 then determining a range distance to each of the saved reference locations.

If none of the saved reference locations are within a selected distance from the current resolved location of the reference station 20, such as 20 meters, for example, the reference station 20 automatically establishes a new position. The selected distance may be based on the accuracy of the GPS system employed for the reference station 20. The more accurate the reference station position determination, be smaller the tolerance can be. Essentially, the selected distance is somewhat arbitrary, in that it just defines a threshold distance from a saved location to facilitate implementation of the methods described herein. Preferably, a reference station would be returned to the exact position of a reference location so that no error or tolerance is needed or introduced. Moreover, preferably the reference location is marked to facilitate an operator returning to substantially the same reference location each time.

In an exemplary embodiment the new position may be determined by an average of positions for a predetermined period of time or until a predetermined level of positional stability is achieved. Decision block 106 depicts the comparison of the resolved location and those saved, while process block 108 depicts establishing a new position determination. Preferably, in an exemplary embodiment, the reference station receiver 20 detects movement using velocity or other means so that any position averaging can be aborted and then resumed once the references station receiver 20 returns to a stationary state. The averaged position is added to the list of reference locations maintained by the reference station 20 and is used by the reference station 20 as its position for calculating code phase and carrier phase corrections that are subsequently transmitted to one or more remote units as described further at a later point herein. Of course, other processes for resolving a location are possible. Averaging, while employed to illustrate and exemplary embodiment, is not absolutely necessary, for example, in another embodiment the instantaneous resolved location may be employed.

Continuing with FIG. 2 and turning to process block 110, if one or more of the saved reference locations are within a predetermined distance from the resolved location of the reference station 20, the closest saved location is selected as the "correct" reference location. This selected reference location is then used by the reference station 20 for computing differential correctors. The computed differential correctors are then computed and transmitted to one or more communications receivers 34 of the remote units 30 as depicted at process blocks 112 and 114. The remote receivers 32 then differentially correct their own measurements of code and carrier phase and determine their own location relative to the location of the reference station 20.

It is often desirable to achieve repeatable relative positioning, even if the reference station 20 is removed and then later returned to the same location. Preferably, in this instance, the reference station 20 is relocated as closely as possible to the original location. Otherwise, a shift in position will occur in the differentially corrected positions computed by the remote unit(s) 30 that is equal in magnitude to any variance in new position of the reference station 20 relative to the previously employed reference location. In an exemplary embodiment a reference location marker 40 is preferably employed for semi-permanent marking of locations so that repeatable positional deployment is possible.

It is noteworthy to appreciate that standard RTCM-104 corrections have proven to be inadequate in optimizing differential corrections for new L1 receiver signal processing. Furthermore, improved methods of reducing ionosphere effects on accuracy have resulted in a new transmission protocol being defined to optimize performance while minimizing data throughput over the communications link. In another exemplary embodiment, both code and carrier phase differential correction terms may be transmitted in the data stream. However, it will be appreciated that in yet another exemplary embodiment, raw code and carrier phase measurements in addition to the reference location of the reference station 20 for corrector processing at the remote units 30. This approach may be advantageous in certain instances such as when it is desired to eliminate the effects caused when computational methods being deployed in the reference station 20 are slightly different than those deployed in the remote unit which may happen if the reference and remote units are developed by different manufacturers. Other examples might include when the remote unit 30 can take advantage of computation beyond just the differential correctors. However, in most instances, it would be preferred to minimize the amount of information that needs be transmitted to a remote unit 30 to save bandwidth on the communication system. Nevertheless, in yet another exemplary embodiment, the reference station 20 transmits its reference location in addition to differential correctors. This approach permits the remote unit 30 to compute range and heading to the reference site as may be desirable in some applications.

In another exemplary embodiment, the reference station 20 includes rechargeable battery, preferably integrated as part of the base station package and that may include a battery monitor.

Furthermore, as depicted at process block 116, additional information may also be sent from the reference station 20 to one or more remote units 30. This information may include, but not be limited to, status information for the reference station 20. For example, the reference station 20 may transmit a status for the optional internal battery 21 and/or time-until-automatic-power saving shut down, and the like. In another exemplary embodiment, information regarding established turn-on and turn-off times for the communications transmitter 26 at the reference station 20 and any radio or GNSS/GPS receiver 22 parameters including the previously mentioned reference location list of reference station 20 can be adjusted remotely from a remote unit 30 or system designated with such rights.

The disclosed invention may be embodied in the form of computer-implemented processes and apparatuses for practicing those processes. The present invention can also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or as a data signal transmitted whether a modulated carrier wave or not, over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

It will be appreciated that the use of "first" and "second" or other similar nomenclature for denoting similar items is not intended to specify or imply any particular order unless otherwise specifically stated. Likewise the use of "a" or "an" or other similar nomenclature is intended to mean "one or more" unless otherwise specifically stated.

While the invention has been described with reference to exemplary embodiments thereof, it will be understood by those skilled in the art that the present disclosure is not limited to such exemplary embodiments and that various changes may be made and equivalents may be substituted for elements thereof without departing from the scope of the invention. In addition, a variety of modifications, enhancements and/or variations may be made to adapt a particular situation or material to the teachings of the invention without departing from the essential spirit or scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for differentially computing remote unit locations in a differential Global Navigation Satellite Systems System (GNSS) comprising:

providing a reference station with a reference GNSS antenna, a reference GNSS receiver coupled to the reference GNSS antenna and a reference communication system including a reference transmitter;

providing a remote unit with a remote GNSS antenna, a remote GNSS receiver coupled to the remote GNSS antenna and a remote communication system including a remote receiver;

saving in said reference station multiple GNSS reference locations;

saving in said reference station a predetermined threshold minimum distance between a GNSS location of said reference receiver and the saved GNSS reference locations; determining a current GNSS location of said reference receiver;

comparing said current GNSS reference receiver location with multiple said saved GNSS reference locations to retrieve a closest saved GNSS reference location:

if a resultant distance between said current GNSS reference receiver location and the closest saved GNSS reference location, as determined by said comparing step, is less than said threshold minimum distance, identifying as the reference location the saved GNSS reference location which is closest to said current GNSS reference receiver location;

otherwise identifying said current GNSS reference receiver location as the reference location and saving in said reference station said current GNSS reference receiver location;

computing differential correction information from signals from one or more GNSS satellites based on the identified reference location;

transmitting via said reference communication system transmitter the computed differential correction information to the remote unit;

receiving with said remote GNSS receiver position information from satellites and the differential correction information; and computing with said remote unit GNSS receiver a remote unit GNSS current position using differential correction information.

2. The method of claim 1 wherein the information includes at least one of:

raw satellite information, range observations, a pseudorange, positioning information, the reference location, phase data, or a plurality of differential correctors.

3. The method of claim 1 where both code and carrier phase correctors derived from code and carrier phase are used for the purpose of correcting a remote unit.

* * * * *